United States Patent
Pan

(10) Patent No.: US 8,326,286 B2
(45) Date of Patent: *Dec. 4, 2012

(54) MULTIPLE IMSI NUMBERS

(75) Inventor: Shaowei Pan, Kildeer, IL (US)

(73) Assignee: Lemko Corporation, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,819

(22) Filed: May 23, 2011

(65) Prior Publication Data

US 2011/0223921 A1   Sep. 15, 2011

Related U.S. Application Data

(63) Continuation of application No. 12/238,269, filed on Sep. 25, 2008, now Pat. No. 7,979,066.

(51) Int. Cl.
H04W 4/00 (2009.01)
(52) U.S. Cl. ............... 455/432.1; 455/433; 370/352; 370/356
(58) Field of Classification Search ............ 455/432.1, 455/433; 370/352, 356, 328
See application file for complete search history.

(56) References Cited

U.S. PATENT DOCUMENTS

| | | |
|---|---|---|
| 4,284,848 A | 8/1981 | Frost |
| 5,590,175 A | 12/1996 | Gallant et al. |
| 5,623,495 A | 4/1997 | Eng et al. |
| 5,734,979 A | 3/1998 | Lu et al. |
| 5,933,784 A | 8/1999 | Gallagher et al. |
| 5,991,639 A | 11/1999 | Rautiola et al. |
| 6,122,499 A | 9/2000 | Magnusson |
| 6,131,038 A | 10/2000 | Sekine et al. |
| 6,141,564 A | 10/2000 | Bruner et al. |
| 6,160,804 A | 12/2000 | Ahmed et al. |
| 6,411,825 B1 | 6/2002 | Csapo et al. |
| 6,418,308 B1 | 7/2002 | Heinonen et al. |
| 6,421,325 B1 | 7/2002 | Kikinis |
| 6,515,985 B2 | 2/2003 | Shmulevich et al. |
| 6,539,237 B1 | 3/2003 | Sayers et al. |
| 6,542,497 B1 | 4/2003 | Curry et al. |
| 6,584,098 B1 | 6/2003 | Dutnall |

(Continued)

FOREIGN PATENT DOCUMENTS

EP   0365885   5/1990

(Continued)

OTHER PUBLICATIONS

Hoffpauir et al., United States Statutory Invention Registration No. H1,918; Entitled "Integrated Authentication Center and Method for Authentication in a Wireless Telecommunications Network"; Filed Feb. 19, 1998; Published Nov. 7, 2000; 19 Pages.

(Continued)

*Primary Examiner* — Ajit Patel
(74) *Attorney, Agent, or Firm* — Toler Law Group, PC

(57) ABSTRACT

A method includes receiving communication data that is directed to a first Mobile Directory Number (MDN) that is associated with a mobile communication device of a mobile subscriber. The first MDN is a local telephone number in a first country. The method includes determining a location of the mobile communication device. A first International Mobile Subscriber Identity (IMSI) number is active when the mobile communication device is located in the first country, and a second IMSI number is active when the mobile communication device is located in a second country. The method includes routing the communication data to the mobile communication device based on the location of the mobile communication device.

20 Claims, 8 Drawing Sheets

U.S. PATENT DOCUMENTS

| | | |
|---|---|---|
| 6,611,533 B1 | 8/2003 | Liao et al. |
| 6,614,784 B1 | 9/2003 | Glitho et al. |
| 6,647,426 B2 | 11/2003 | Mohammed |
| 6,678,155 B1 | 1/2004 | Bresniker |
| 6,694,134 B1 | 2/2004 | Lu et al. |
| 6,697,355 B1 | 2/2004 | Lim |
| 6,704,409 B1 | 3/2004 | Dilip et al. |
| 6,731,932 B1 | 5/2004 | Rune et al. |
| 6,735,184 B1 | 5/2004 | Davidson et al. |
| 6,751,207 B1 | 6/2004 | Lee et al. |
| 6,760,325 B1 | 7/2004 | Hameleers et al. |
| 6,763,226 B1 | 7/2004 | McZeal, Jr. |
| 6,763,233 B2 | 7/2004 | Bharatia |
| 6,791,988 B1 | 9/2004 | Hameleers |
| 6,795,444 B1 | 9/2004 | Vo et al. |
| 6,807,431 B2 | 10/2004 | Sayers |
| 6,807,432 B2 | 10/2004 | Hwang |
| 6,816,706 B1 | 11/2004 | Hohnstein et al. |
| 6,819,652 B1 | 11/2004 | Akhtar et al. |
| 6,831,903 B2 | 12/2004 | Kang |
| 6,839,356 B2 | 1/2005 | Barany et al. |
| 6,859,652 B2 | 2/2005 | Karabinis et al. |
| 6,871,072 B1 | 3/2005 | Meche |
| 6,879,582 B1 | 4/2005 | Dhara et al. |
| 6,879,677 B2 | 4/2005 | Trandal et al. |
| 6,917,813 B2 | 7/2005 | Elizondo |
| 6,937,708 B2 | 8/2005 | Hirose |
| 6,958,983 B2 | 10/2005 | Musikka et al. |
| 6,985,454 B1 | 1/2006 | Wiedeman et al. |
| 7,003,286 B2 | 2/2006 | Brown et al. |
| 7,050,414 B2 | 5/2006 | Lin |
| 7,054,307 B2 | 5/2006 | Papadimitriou et al. |
| 7,054,322 B2 | 5/2006 | D'Annunzio et al. |
| 7,120,435 B2 | 10/2006 | Usher et al. |
| 7,120,436 B2 | 10/2006 | Kim |
| 7,133,670 B1 | 11/2006 | Moll et al. |
| 7,136,651 B2 | 11/2006 | Kalavade |
| 7,158,621 B2 | 1/2007 | Bayne |
| 7,171,216 B1 | 1/2007 | Choksi |
| 7,299,039 B2 | 11/2007 | Lee et al. |
| 7,313,399 B2 | 12/2007 | Rhee et al. |
| 7,324,478 B2 | 1/2008 | Park et al. |
| 7,328,268 B1 | 2/2008 | Foltak et al. |
| 7,346,334 B2 | 3/2008 | Gaeta et al. |
| 7,349,412 B1 | 3/2008 | Jones et al. |
| 7,359,700 B2 | 4/2008 | Swensen et al. |
| 7,385,947 B2 | 6/2008 | Wu et al. |
| 7,406,069 B2 | 7/2008 | Yashar et al. |
| 7,424,313 B2 | 9/2008 | Ham et al. |
| 7,486,967 B2 | 2/2009 | Pan et al. |
| 7,536,170 B2 | 5/2009 | Goldman et al. |
| 7,539,158 B2 | 5/2009 | Pan |
| 7,548,763 B2 | 6/2009 | Pan |
| 7,552,670 B2 | 6/2009 | Goldman et al. |
| 7,653,414 B2 | 1/2010 | Pan |
| 7,738,488 B2 | 6/2010 | Marsico et al. |
| 7,760,695 B2 | 7/2010 | Gopalakrishnan et al. |
| 7,787,879 B1 | 8/2010 | Philips et al. |
| 7,840,230 B2 | 11/2010 | Pan |
| 7,855,988 B2 | 12/2010 | Pan |
| 7,979,066 B2 | 7/2011 | Pan |
| 8,036,158 B2 | 10/2011 | Pan et al. |
| 8,046,420 B2 | 10/2011 | Pan |
| 8,089,920 B2 | 1/2012 | Pan |
| 8,107,409 B2 | 1/2012 | Pan |
| 2001/0046859 A1 | 11/2001 | Kil |
| 2001/0055298 A1 | 12/2001 | Baker et al. |
| 2002/0009060 A1 | 1/2002 | Gross |
| 2002/0015392 A1 | 2/2002 | Musikka et al. |
| 2002/0016180 A1 | 2/2002 | Derosier et al. |
| 2002/0045444 A1 | 4/2002 | Usher et al. |
| 2002/0051518 A1 | 5/2002 | Bondy et al. |
| 2002/0058502 A1 | 5/2002 | Stanforth |
| 2002/0061746 A1 | 5/2002 | Jo et al. |
| 2002/0160772 A1 | 10/2002 | Gailey et al. |
| 2002/0169887 A1 | 11/2002 | MeLampy et al. |
| 2003/0048766 A1 | 3/2003 | D'Annunzio et al. |
| 2003/0088698 A1 | 5/2003 | Singh et al. |
| 2003/0092441 A1 | 5/2003 | Taha et al. |
| 2003/0096628 A1 | 5/2003 | Bar-On et al. |
| 2003/0100302 A1 | 5/2003 | Armbruster et al. |
| 2003/0153343 A1 | 8/2003 | Crockett et al. |
| 2004/0014466 A1 | 1/2004 | Jesse et al. |
| 2004/0018829 A1 | 1/2004 | Raman et al. |
| 2004/0019539 A1 | 1/2004 | Raman et al. |
| 2004/0156495 A1 | 8/2004 | Chava et al. |
| 2004/0203621 A1 | 10/2004 | Brown et al. |
| 2004/0203677 A1 | 10/2004 | Brown et al. |
| 2004/0204097 A1 | 10/2004 | Scheinert et al. |
| 2004/0253984 A1 | 12/2004 | Csapo et al. |
| 2004/0259556 A1 | 12/2004 | Czys |
| 2005/0064922 A1 | 3/2005 | Owens et al. |
| 2005/0070278 A1 | 3/2005 | Jiang |
| 2005/0075106 A1 | 4/2005 | Jiang |
| 2005/0091392 A1 | 4/2005 | Gesswein et al. |
| 2005/0250491 A1 | 11/2005 | Roy et al. |
| 2006/0046714 A1 | 3/2006 | Kalavade |
| 2006/0046760 A1 | 3/2006 | Bertino et al. |
| 2006/0052113 A1 | 3/2006 | Ophir et al. |
| 2006/0063544 A1 | 3/2006 | Zhao et al. |
| 2006/0114934 A1 | 6/2006 | Shin et al. |
| 2006/0141984 A1 | 6/2006 | Taglienti et al. |
| 2006/0142011 A1 | 6/2006 | Kallio |
| 2006/0148465 A1 | 7/2006 | Perdomo et al. |
| 2006/0159039 A1 | 7/2006 | Jung et al. |
| 2006/0203746 A1 | 9/2006 | Maggenti et al. |
| 2006/0217121 A1 | 9/2006 | Soliman et al. |
| 2006/0221912 A1 | 10/2006 | Olivier et al. |
| 2006/0258358 A1 | 11/2006 | Kallio |
| 2007/0008968 A1 | 1/2007 | Baker et al. |
| 2007/0010245 A1 | 1/2007 | Levitan |
| 2007/0021097 A1 | 1/2007 | Gaeta et al. |
| 2007/0021118 A1* | 1/2007 | Ophir ........................ 455/432.1 |
| 2007/0060124 A1 | 3/2007 | Kalavade |
| 2007/0076697 A1 | 4/2007 | Huotari et al. |
| 2007/0087738 A1 | 4/2007 | Melkesetian |
| 2007/0147598 A1 | 6/2007 | Somes et al. |
| 2007/0213075 A1 | 9/2007 | Jiang |
| 2007/0230352 A1 | 10/2007 | Kokku et al. |
| 2007/0232267 A1 | 10/2007 | Pan |
| 2007/0232304 A1 | 10/2007 | Goldman et al. |
| 2007/0234892 A1 | 10/2007 | Goldman et al. |
| 2007/0243891 A1 | 10/2007 | Civanlar et al. |
| 2007/0271606 A1 | 11/2007 | Amann et al. |
| 2007/0287452 A1 | 12/2007 | Pan |
| 2007/0291910 A1 | 12/2007 | Bucchieri et al. |
| 2008/0101314 A1 | 5/2008 | Bachmutsky |
| 2008/0101410 A1 | 5/2008 | Barkley et al. |
| 2008/0146158 A1 | 6/2008 | Pan et al. |
| 2008/0168523 A1 | 7/2008 | Ansari et al. |
| 2009/0003269 A1 | 1/2009 | Kumazawa et al. |
| 2009/0022155 A1 | 1/2009 | Rosenberg et al. |
| 2009/0067441 A1 | 3/2009 | Ansari et al. |
| 2009/0186626 A1 | 7/2009 | Raghothaman |
| 2009/0215449 A1* | 8/2009 | Avner ........................ 455/433 |
| 2009/0227230 A1 | 9/2009 | Camilleri et al. |
| 2009/0325584 A1 | 12/2009 | Pan |
| 2009/0327819 A1 | 12/2009 | Pan |
| 2010/0048197 A1* | 2/2010 | Jiang ........................ 455/422.1 |
| 2010/0048208 A9 | 2/2010 | Gunaratnam et al. |
| 2010/0057485 A1* | 3/2010 | Luft ........................ 705/1 |
| 2010/0080214 A1 | 4/2010 | Li et al. |
| 2010/0094878 A1 | 4/2010 | Soroca et al. |
| 2010/0217837 A1 | 8/2010 | Ansari et al. |
| 2011/0059740 A1 | 3/2011 | Pan |
| 2011/0060853 A1 | 3/2011 | Pan |
| 2012/0002607 A1 | 1/2012 | Pan |

FOREIGN PATENT DOCUMENTS

| | | |
|---|---|---|
| WO | 2007102003 A1 | 9/2007 |

OTHER PUBLICATIONS

Pan, U.S. Appl. No. 13/309,003; "Providing Communications Using a Distributed Mobile Architecture"; filed Dec. 20, 2011.

Notice of Allowance and Fee(s) Due for U.S. Appl. No. 12/238,269 received from the United States Patent and Trademark Office (USPTO), mailed Feb. 7, 2011, 14 pages.

Notice of Allowance and Fee(s) Due for U.S. Appl. No. 12/238,269 received from the United States Patent and Trademark Office (USPTO), mailed Mar. 31, 2011, 5 pages.

The International Search Report and the Written Opinion for International Application No. PCT/US2009/050522 received from the International Searching Authority (ISA/KR) mailed Feb. 1, 2011, 9 pages.

B.G. Evans and K. Baughan; "Visions of 4G"; Electronics & Communication Engineering Journal; Dec. 2000; pp. 293-303.

Shirshanka Das, Alok Nandan & Giovanni Pau (University of CA, Los Angeles, CA, USA); "SPAWN: A Swarming Protocol for Vehicular Ad-Hoc Wireless Networks"; VANET'04, Oct. 1, 2004, Philadelphia, PA, USA; ACM 1-58113-922-5/04/0010; 2 pgs.

Yu-Chee Tseng, Chia-Ching Shen (National Chiao Tung University) & Wen-Tsuen Chen (National Tsing Hua University); "Integrating Mobile IP with AD Hoc Networks"; IEEE Computer Society; 0018-9162/03; 2003 IEEE; May 2003; pp. 48-55.

Halim Yanikomeroglu, David D. Falconer & Van M. Sreng; "Coverage Enhancement Through Two-Hop Peer-to-Peer Relaying in Cellular Radio Networks"; Broadband Communications and Wireless Systems (BCWS) Centre Department of Systems & Computer Engineering, Carleton University, Ottawa, Canada; WWRF Meeting #7, Eindhoven, the Netherlands, Dec. 3-4, 2002, WG4: Spectrum, New Air Interfaces and Ad-Hoc Networking Multi-Hop Wireless Systems; 10 pages.

Bur Goode; "Voice Over Internet Protocol (VoIP)"; 0018-9219/02 2002 IEEE; Proceedings of the IEEE; vol. 90, No. 9, Sep. 2002; pp. 1495-1517.

Kyung-Hyu Lee, Kyu-Ok Lee & Kwon-Chul Park (Network Research Laboratory ETRI Korea) Jong-Ok Lee and YoonHak Bang (Network Planning Team KT Korea); "Architecture to be Deployed on Strategies of Next-Generation Networks"; 0/7803-7802-4/03 2003 IEEE; pp. 819-822.

Wolfgang Kellerer, Christian Bettstetter, Christian Schwingenschlögl & Peter Sties (Technische Universität München) Karl-Ernst Steinberg (BMW) & Hans-Jörg Vögel (the Fantastic Corp); "(Auto) Mobile Communication in a Heterogeneous and Converged World"; IEEE Personal Communications; Dec. 2001; 1070-9916/01; 2001 IEEE pp. 41-47.

Nilanjan Banerjee & Sajal K. Das (University of Texas, Arlington) & Arup Acharya (IBM T.J. Watson Research Center) "Peer-to-peer SIP-based Services over Wireless Ad Hoc Networks"; BROADWIM: Broadband Wireless Multimedia Workshop; Oct. 29, 2004—broadnets.org; *This work was supported by NSF under the ORBIT testbed project, grant # NSF NRT Project #ANI-0335244 and by NSF ITR grant IIS-0326505; 8 pages.

Hung-Yu Wei (Columbia University) & Richard D. Gitlin (NEC Laboratories America); "Two-Hop-Relay Architecture for Next-Generation WWAN/WLAN Integration"; 4G Mobile Communications: Toward Open Wireless Architecture; 1536-1284/04 2004 IEEE; IEEE Wireless Communications; Apr. 2004; pp. 2-9.

Wolfgang Kellerer (LKN, Munich University of Technology), Hans-Jörg Vögel (the Fantastic Corp.) & Karl-Ernst Steinberg (BMW); "A Communication Gateway for Infrastructure Independent Wireless Access"; IEEE Communications Magazine; Mar. 2002; vol. 9; No. 3; 6 pages.

Willie W. Lu & Jenny Hu (U.S. Center for Wireless Communications, Stanford University, CA); "Open Wireless Architecture—The Core to 4G Mobile Communications"; China Communications; Apr. 2006; pp. 32-39.

Ralf Pabst, Bernard H. Walke & Daniel C. Schultz (RWTH Aachen University) Patrick Herhold & Gerhard P. Fettweis (Technical University of Dresden) Halim Yanikomeroglu & David D. Falconer (Carleton University) Sayandev Mukherjee & Harish Viswanathan (Lucent Technologies) Matthias Lott & Wolfgang Zirwas (Siemens ICM) Mischa Dohler & Hamid Aghvami (Kings College); "Relay-Based Deployment Concepts for Wireless and Mobile Broadband Radio"; 0163-6804/04; 2004 IEEE; IEEE Communications Magazine; Sep. 2004; pp. 80-89.

Simone Frattasi, Hanane Fathi, Frank H.P. Fitzek & Ramjee Prasad (Aalborg University) Marcos D. Katz (Samsung Electronics); "Defining 4G Technology from the User's Perspective"; IEEE Network; Jan./Feb. 2006; 0890-8044/06; 2006 IEEE; pp. 35-41.

Ian F. Akyildiz (Broadband and Wireless Networking BWN Lab, Georgia Institute of Technology) Xudong Wang & Weilin Wang (Kiyon, Inc. La Jolla, CA); "Wireless Mesh Networks: A Survey"; Computer Networks 47; Jan. 1, 2005; pp. 445-487; 1389-1286 2004 Elsevier B.V.

Brian Woerner (Virginia Tech, Blacksburg, VA) & Mostofa Howlader (University of Tennessee, Knoxville, TN); "Research Directions for Fourth Generation Wireless"; Proceedings of the 10th IEEE International Workshops on Enabling Technologies: Infrastructure for Collaborative Enterprises (WETICE 2001); Jun. 20-22, 2001; Cambridge, MA, USA; IEEE Computer Society 2001; ISBN 0/7695-1269-0; 2 pages.

"Framework and Overall Objectives of the Future Development of IMT-2000 and Systems Beyond IMT-2000"; International Telecommunication Union; ITU-R Radiocommunication Sector of ITU; Recommendation ITU-R M.1645 (Jun. 2003); M Series; Mobile, Radiodetermination, Amateur and Related Satellite Services; 26 pages.

* cited by examiner

MULTIPLE IMSI NUMBERS

CLAIM OF PRIORITY

The present application claims priority from and is a continuation of patent application Ser. No. 12/238,269 filed on Sep. 25, 2008 and entitled "MULTIPLE IMSI CONNECTIONS," the contents of which are expressly incorporated herein by reference in their entirety.

FIELD OF THE DISCLOSURE

The present disclosure relates generally to International Mobile Subscriber Identity (IMSI) numbers.

BACKGROUND

An International Mobile Subscriber Identity (IMSI) number enables international roaming of cellular phones. Each IMSI number includes a first set of digits associated with a mobile country code, a second set of digits associated with a mobile network code, and a third set of digits associated with a wireless carrier of a particular country. International roaming often involves a wireless carrier from a roaming country communicating data to a wireless carrier of a home country for authentication of mobile subscriber information. After authentication, a roaming device can receive incoming calls and make outgoing calls. However, calls to the roaming device are charged at international roaming rates, resulting in expensive calls.

DETAILED DESCRIPTION

Figure 1:
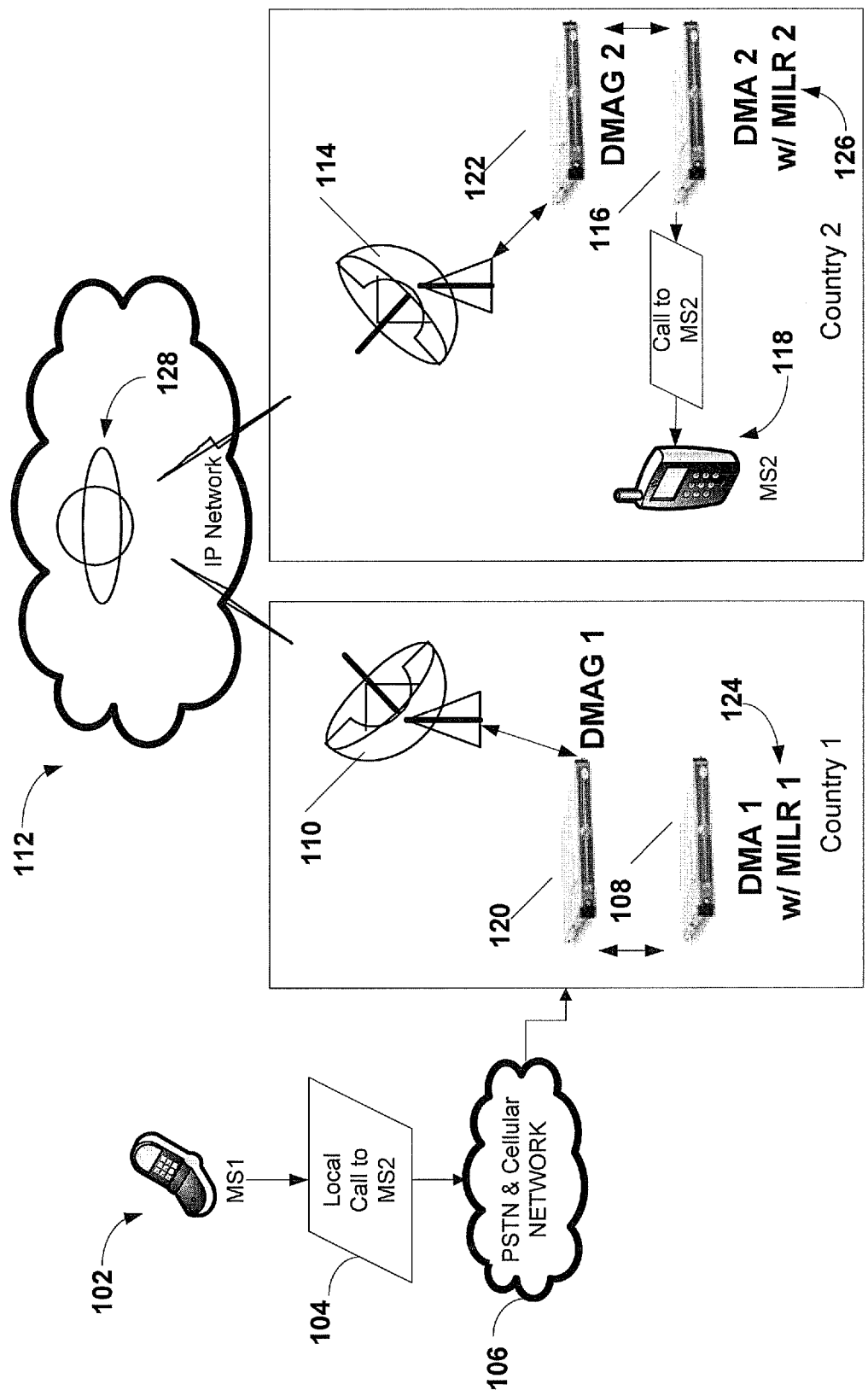
FIG. 1 is a diagram of a system used to route telephone calls from a first country to a second country via an Internet Protocol network.

In a particular illustrative embodiment, a computer readable storage medium includes a multiple International Mobile Subscriber Identity (IMSI) location register (MILR) module. The MILR module stores a first IMSI number and a first Mobile Directory Number (MDN) associated with a mobile communication device of a mobile subscriber. The first IMSI number and the first MDN are associated with a first country, and the first MDN is a local telephone number in the first country. The MILR module stores a second IMSI number and a second MDN associated with the mobile communication device. The second IMSI number and the second MDN number are associated with a second country, and the second MDN is a local telephone number in the second country. The MILR module further stores location information. The first IMSI number is active when the mobile communication device is located in the first country, and the second IMSI number is active when the mobile communication device is located in the second country.

In another illustrative embodiment, a system includes a distributed mobile architecture (DMA) server that is located in a first country. The DMA server includes a processor, an MILR module, and processor executable instructions. The MILR stores a first IMSI number, a first MDN number, a second IMSI number, and a second MDN number that are associated with a mobile communication device of a mobile subscriber. The first IMSI number and the first MDN are associated with a first country, and the first MDN is a local telephone number in the first country. The second IMSI number and the second MDN number are associated with a second country, and the second MDN is a local telephone number in the second country. The MILR further stores location information. The first IMSI number is active when the mobile communication device is located in the first country, and the second IMSI number is active when the mobile communication device is located in the second country. The DMA server includes instructions that, when executed by the processor, cause the processor to determine a location of the mobile communication device based on the location information and to route communication data to the mobile communication device based on the location of the mobile communication device.

In another illustrative embodiment, a method includes receiving communication data that is directed to a first MDN that is associated with a mobile communication device of a mobile subscriber. The first MDN is a local telephone number in a first country. The method includes determining a location of the mobile communication device. A first IMSI number is active when the mobile communication device is located in the first country, and a second IMSI number is active when the mobile communication device is located in a second country. The method includes routing the communication data to the mobile communication device based on the location of the mobile communication device.

In another illustrative embodiment, a method of routing telephone calls from a first country to a second country via an Internet Protocol (IP) network is disclosed. The method includes receiving a telephone call directed to a first Mobile Directory Number (MDN) in a first country. When the mobile subscriber associated with the first MDN is located in a second country, the method includes routing the telephone call to the second country via the IP network.

In another illustrative embodiment, a system includes a first home location register (HLR) module, a first visitor location register (VLR) module, and a first community location register (CLR) module. The system includes a first multiple International Mobile Subscriber Identity (IMSI) location register (MILR) module. The first MILR module includes user information associated with a plurality of mobile subscribers. For each of the mobile subscribers, the user information includes a first IMSI number and a first Mobile Directory Number (MDN) associated with a first country. The user information includes a second IMSI number and a second MDN associated with a second country. The user information also includes active location information for each of the mobile subscribers.

FIG. 1 illustrates a system that may be used to route telephone calls from a first country to a second country via an Internet Protocol (IP) network 112. In the particular embodiment illustrated in FIG. 1, the IP network 112 includes a satellite link 128 (or microware) between the first country and the second country. In alternative embodiments, the IP network 112 includes a wired link (under ground fiber optical cable or under sea optical cable) between the first country and the second country. The system includes a first distributed mobile architecture server 108 located in the first country and a second distributed mobile architecture server 116 located in the second country. The first distributed mobile architecture server 108 located in the first country is linked to the second distributed mobile architecture server 116 in the second country via the IP network 112. In the particular embodiment illustrated in FIG. 1, both the first distributed mobile architecture server 108 located in the first country and the second distributed mobile architecture server 116 located in the second country may be connected to one or more distributed mobile architecture gateways (DMAGs) 120 and 122, providing an interface between the distributed mobile architecture servers and multiple networks.

The system may be used to receive a telephone call directed to a first Mobile Directory Number (MDN) from a first mobile subscriber 102 located in the first country. In a particular embodiment, the first MDN is a local telephone number in the first country. Thus, the first mobile subscriber 102 may make a local call 104 to a second mobile subscriber 118. The local call 104 from the first mobile subscriber 102 may be received via an existing Public Switched Telephone Network (PSTN) or via an existing cellular network 106.

When the mobile subscriber associated with the first MDN is located in the first country, a telephone call to the first MDN received from a caller in the second country is routed to the first MDN via the IP network 112. In the example shown in FIG. 1, the second mobile subscriber 118 is located in the second country.

The local call 104 is received at a first distributed mobile architecture server 108 located in the first country. The first distributed mobile architecture server 108 includes a first multiple International Mobile Subscriber Identity (IMSI) location register (MILR) module 124. The first MILR module 124 includes user information associated with a plurality of mobile subscribers. For each of the mobile subscribers, the user information includes a first IMSI number and a first Mobile Directory Number (MDN) associated with the first country. The first MILR module 124 also includes user information associated with a second IMSI number and a second MDN associated with the second country. The first MILR module 124 may also include user information associated with other IMSI numbers and MDNs associated with other countries. The first MILR module also includes active location information related to each mobile subscriber. The active location information records information related to a current location of a particular mobile subscriber. In a particular embodiment, the first distributed mobile architecture server 108 also includes a first home location register (HLR) module, a first visitor location register (VLR) module, and a first community location register (CLR) module.

The local call 104 received at the first distributed mobile architecture server 108 may be routed to the second country via the IP network 112, which may include a satellite link 128 between the first country and the second country. In alternative embodiments, the IP network 112 may include another wireless link or a wired link between the first country and the second country. In the embodiment shown in FIG. 1, the first distributed mobile architecture server 108 transmits the local call 104 over the IP network 112 via a first transceiver 110. The local call 104 is transmitted to a satellite 128 which retransmits the local call 104 to a second transceiver 114 located in the second country. The second transceiver 114 is associated with a second distributed mobile architecture server 116 that includes a second MILR module 126. The second MILR module 126 includes user information associated with one or more IMSI numbers and one or more MDNs associated with multiple countries. The second MILR module 126 also includes active location information related to each mobile subscriber. In a particular embodiment, the second MILR module 126 also includes a second HLR module, a second VLR module, and a second CLR module.

Upon receiving the local call 104 via the IP network 112 at the second transceiver 114, the second distributed mobile architecture server 116 routes the local call 104 to the second mobile subscriber 118 located in the second country. Thus, a telephone call to the first MDN from the first mobile subscriber 102 located in the first country is routed to the second MDN via the IP network when the second mobile subscriber 118 is located in the second country.

Figure 2:
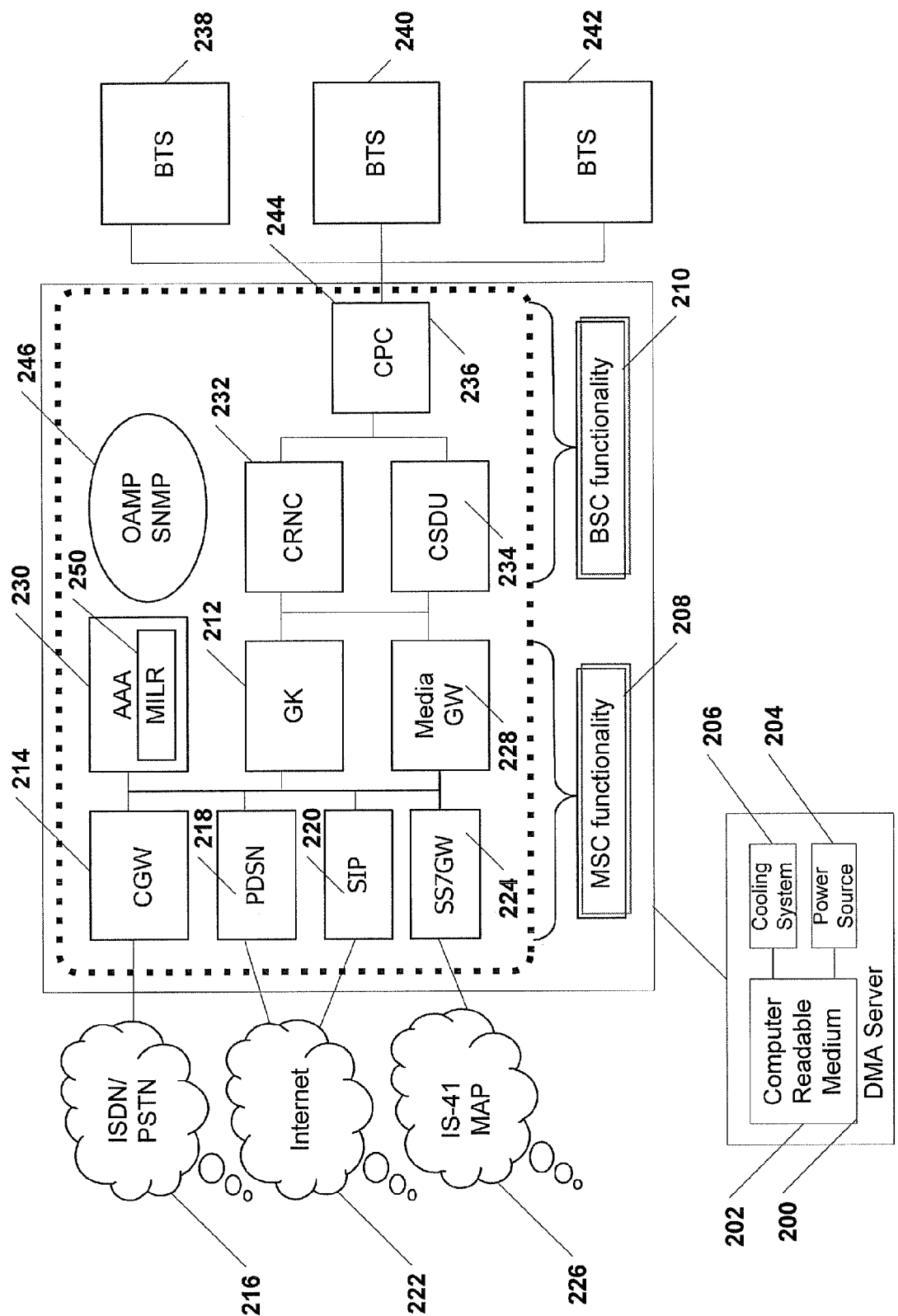
FIG. 2 is a block diagram of a particular illustrative embodiment of a distributed mobile architecture server including an authentication, accounting and authorization (AAA) module with a multiple International Mobile Subscriber Identity (IMSI) location register (MILR) module that may be used as a component of the system of FIG. 1.

FIG. 2 shows an exemplary, non-limiting, embodiment of a distributed mobile architecture server 200, e.g., one or more of the distributed mobile architecture servers described in conjunction with FIG. 1. In a particular embodiment, the distributed mobile architecture server 200 includes a processor, or computer, having a housing and a computer readable medium 202 that is disposed therein. A power supply 204 can also be disposed within the housing of the distributed mobile architecture server 200 in order to provide power to the distributed mobile architecture server 200. The power supply 204 can be a rechargeable battery disposed within the distributed mobile architecture server 200 or the power supply 204 can be external to the distributed mobile architecture server 200, i.e., a standard power outlet. Moreover, a cooling system 206, e.g., a fan with a thermostat, can be within the distributed mobile architecture server 200 in order to keep the distributed mobile architecture server 200 from overheating. In an alternative embodiment, the distributed mobile architecture server 200 can be a single board processor that does not require a fan.

As depicted in FIG. 2, the distributed mobile architecture server 200 includes a mobile switching center (MSC) module 208 and a base station controller (BSC) module 210 embedded within the computer readable medium 202. In an exemplary, non-limiting embodiment, the MSC module 208 can include a gatekeeper (GK) 212 that is connected to several gateways. For example, a circuit gateway (CGW) 214 can be connected to the GK 212 and can provide connectivity to an integrated services digital network/public switched telephone network (ISDN/PSTN) interface 216. The CGW 214 can provide a circuit switched to packet data conversion. In an exemplary, non-limiting embodiment, the PSTN portion of the ISDN/PSTN interface 216 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 216.

As further illustrated in FIG. 2, a packet data server node (PDSN) gateway 218 for CDMA, or a Gateway GPRS Support Node (GGSN) for Global System for Mobile Communication (GSM), and a Session Initiation Protocol (SIP) gateway 220 can also be connected to the GK 212. The PDSN gateway 218 and the SIP gateway 220 can provide connectivity to an Internet protocol (IP) interface 222. Further, the PDSN gateway 218 or a GGSN can establish a reverse tunnel with the PDSN or GGSN gateway 218 using generic routing encapsulation (GRE). Moreover, the PDSN gateway 218, or GGSN, can implement the Pseudo Random Function (PRF)/Foreign Agent (FA) functionality of the distributed mobile architecture 200 which supports mobile IP functions.

FIG. 2 further shows an SS7 gateway 224 that provides connectivity to an ANSI-41 and GSM Mobile Application Part (MAP) interface 226. In a particular embodiment, the ANSI-41 interface can be an SS7 TCAP/SCCP interface on the same SS7 link set used for ISUP signaling. The same SS7 point code can be used to identify the distributed mobile architecture 200 in the ANSI-41 network. The ANSI-41 interface can be used for roamer registration. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently.

As depicted in FIG. 2, a media gateway 228 can also be coupled to the GK 212. In an exemplary, non-limiting embodiment, the media gateway 228 can include cellular transcoders, one or more intranet gateways, conferencing bridges, and group calling functionality. Further, an authentication, authorization, and accounting (AAA) module 230 can be coupled to the GK 212. In an exemplary, non-limiting embodiment, there are three levels of authentication management. The highest level is for administration, the mid-level is for operations, and the lowest level is for normal users. The functions of the AAA module 230 can be included in the user level. The AAA module 230 includes a multiple International Mobile Subscriber Identity (IMSI) location register (MILR) module 250. The MILR module 250 includes user information associated with one or more IMSI numbers and one or more MDNs associated with multiple countries. The MILR module 250 also includes active location information related to each mobile subscriber. In a particular embodiment, the MILR module 250 also includes an HLR module, a VLR module, and a CLR module.

In an exemplary, non-limiting embodiment, the GK 212 can act as an AAA server and a feather server to support advanced supplementary service, short message service, etc. Moreover, the GK 212 can act as a call manager and can support ISUP and PSTN function calls. Additionally, the GK 212 can act as a signal gateway, e.g., IP to SS7 inter-working, ISUP, GSM MAP or ANSI-41 to PSTN and ANSI-42/GSM. The GK 212 can also function as a data call server.

As illustrated in FIG. 2, the BSC module 210 includes a cellular radio network controller (CRNC) 232 and a cellular selection/distribution unit (CSDU) 234 that are connected to a call protocol controller (CPC) 236. In turn, the CPC 236 can be connected to a plurality of base transceiver stations (BTSs) 238, 240 and 242. Specifically, the distributed mobile architecture 200 includes a BTS interface 244 at the CPC 236 that can be physically and directly connected to the BTSs 238, 240 and 242. The CRNC 232 can provide cellular radio resource management and cellular call control. The CSDU 234 can provide Fundamental Channel (FCH) soft handoff and distribution, Link Access Control (LAC) processing for inband signaling, multiplexer (MUX) functions, and centralized power control. Further, the CPC 236 can convert a T1 or E1 message or ATM interface to a data packet message. In a particular embodiment, each BTS 238, 240 and 242 supports signals and traffic up to the front point of the CPC 236, e.g., up to the BTS interface 244. Further, in a particular embodiment, the CRNC 232, the CPC 236, the CSDU 234 and the OAMP 246 can perform one or more of the functions of legacy Base Station Controllers (BSC).

In an exemplary, non-limiting embodiment, the BTS interface 244 can be an IS-95A OR IS-2000 interface over E1 or ATM, or the BTS interface 244 can be a GSM BTS interface using MAP or customized application for mobile network enhanced logic (CAMEL). In an illustrative embodiment, the CPC 236 can be connected to one or more BTSs 238, 240 and 242. FIG. 2 further shows that the BSC module 210 includes an operations, administration, maintenance, and provisioning (OAMP) module 246. In an exemplary, non-limiting embodiment, the OAMP module 246 can use simple network management protocol (SNMP) for operations interfaces. Further, the OAMP module 246 can include a JAVA user interface. The OAMP module 246 can also include a software agent that is assigned to each component within the distributed mobile architecture 200. The agents independently monitor their respective components. Moreover, each agent can provision its respective component.

In a particular embodiment, a distributed mobile architecture can be implemented as a system or a device. For example, a distributed mobile architecture system or a distributed mobile architecture device can include a distributed mobile architecture server or a distributed mobile architecture on single processor board.

Figure 3:
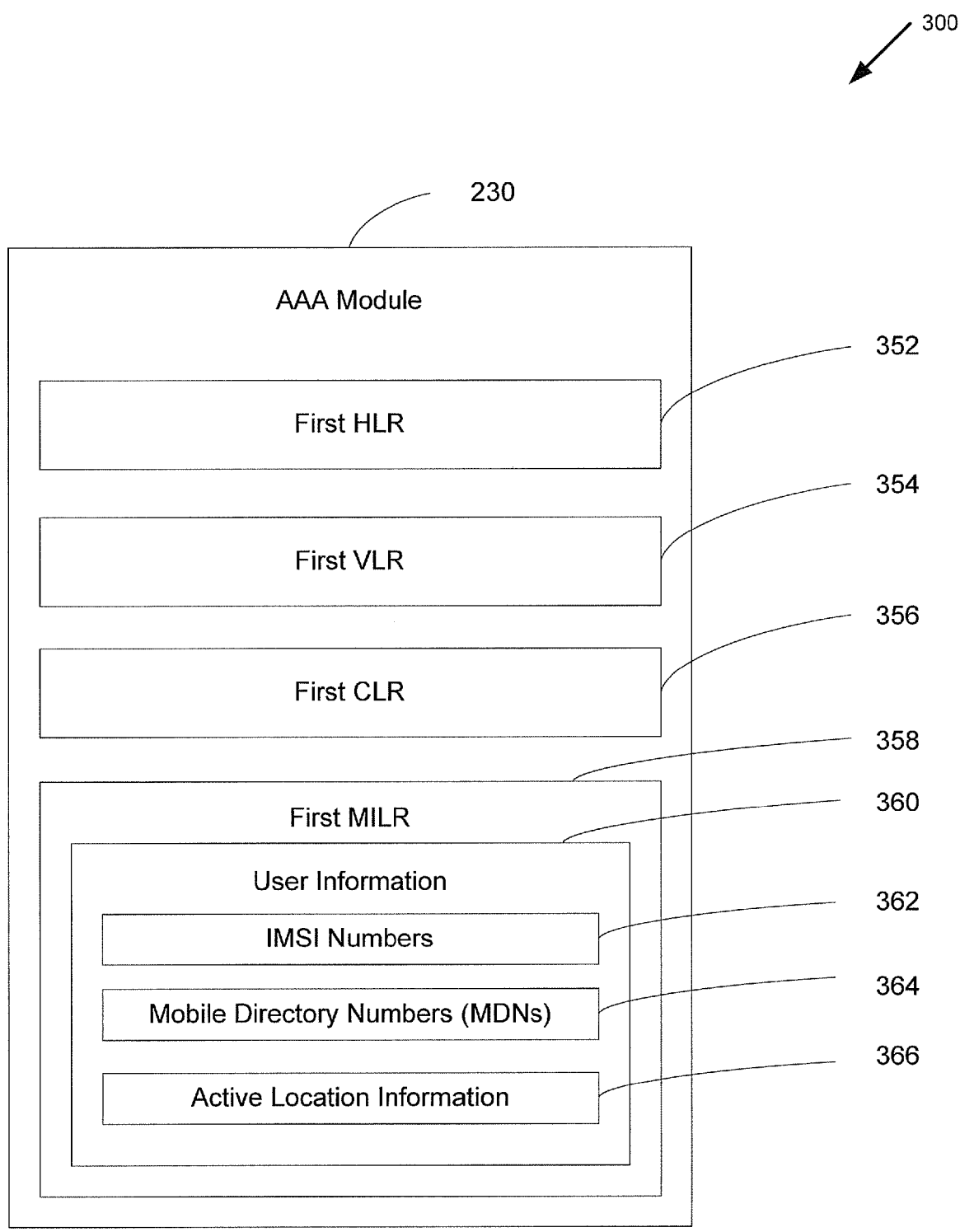
FIG. 3 is a diagram of a particular illustrative embodiment of an AAA module with an MILR module.

Referring to FIG. 3, a particular illustrative embodiment of an authentication authorization and accounting (AAA) module is illustrated at 300. In a particular embodiment, the AAA module is the AAA module 230 of FIG. 2. The AAA module 300 includes a first HLR module 352, a first VLR module 354, and a first CLR module 356. The AAA module 300 also includes a first MILR module 358. The first MILR module 358 includes user information 360 associated with a plurality of mobile subscribers. For each of the mobile subscribers, the user information 360 includes one or more IMSI numbers 362, one or more MDNs 364, and active location information 366 for each mobile subscriber.

In a particular embodiment, the active location information 366 records information related to a current location of a particular mobile subscriber. In a particular embodiment, the one or more IMSI numbers 362 include a first IMSI number and a second IMSI number, and the one or more MDNs 364 include a first representative MDN and a second representative MDN. The first IMSI number and the first MDN are associated with a first country, while the second IMSI number and the second MDN are associated with a second country.

In another particular embodiment, the one or more IMSI numbers 362 also include a third IMSI number and a third MDN, where the third IMSI number and the third MDN are associated with a third country. Thus, the user information 360 may include multiple IMSI numbers and multiple MDNs associated with multiple countries. The IMSI numbers 362 and the MDNs 364 may be stored on a Subscriber Identity Module (SIM) card of a wireless communication device, as described below.

In a particular embodiment, a first set of three digits of the first IMSI number represents a first mobile country code (MCC) associated with the first country. A second set of three digits of the IMSI number represents a first mobile network code (MNC) associated with a first wireless carrier located in the first country. Similarly, a first set of three digits of the second IMSI number represents a second MCC associated with the second country, and the second set of three digits of the second IMSI number represents a second MNC associated with a second wireless carrier located in the second country.

When the mobile subscriber associated with the first MDN is located in the second country, a telephone call to the first MDN received from a caller in the first country is routed to the second MDN via the IP network. In a particular embodiment, the first MDN is a local telephone number in the first country. Thus, the first MDN allows local telephone calls in the first country to be routed to the second country via the IP network without incurring international and similar long distance charges.

Figure 4:
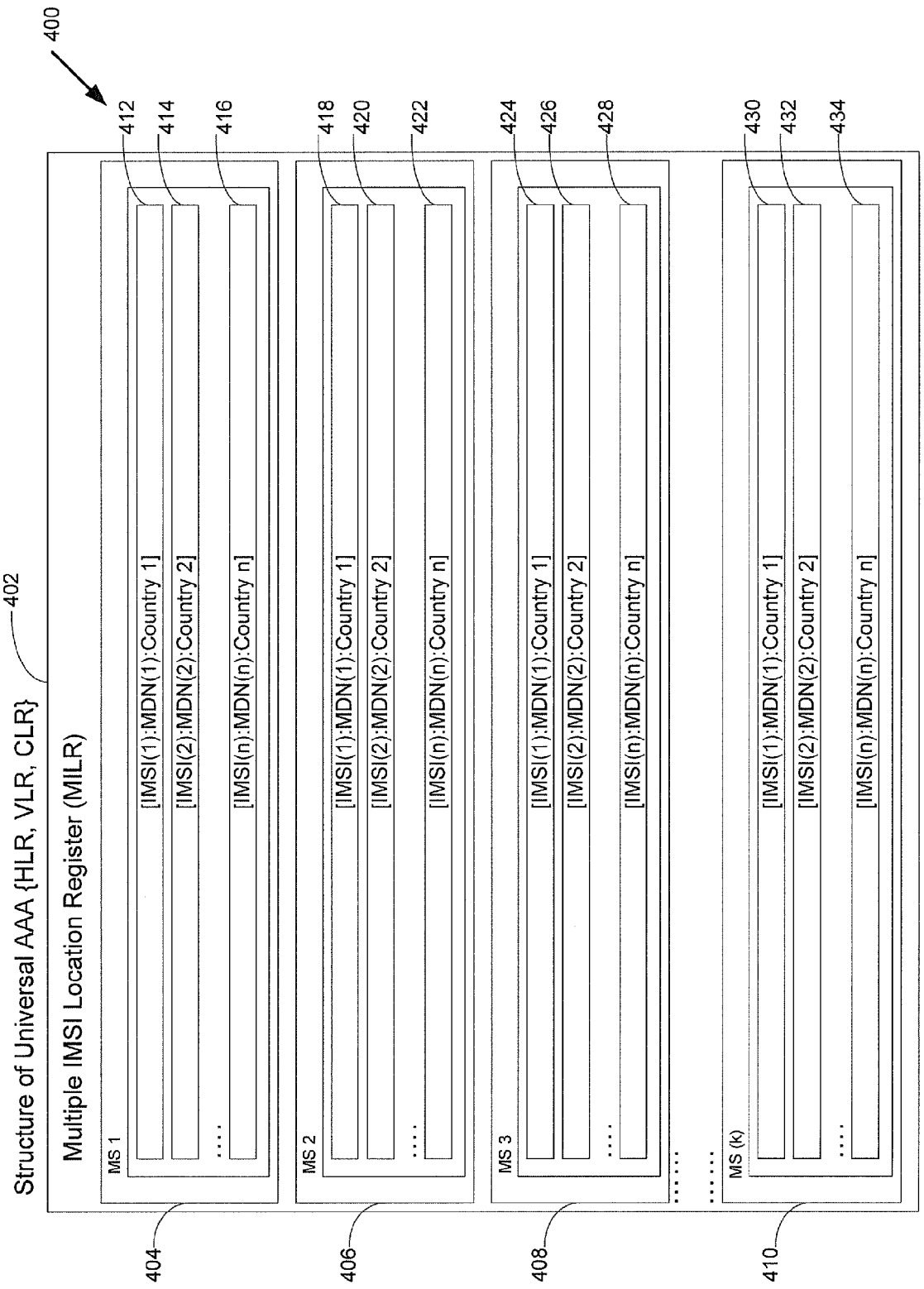
FIG. 4 is a diagram of a particular illustrative embodiment of data stored in an MILR module.

FIG. 4 illustrates a structure of a universal authentication, authorization and accounting (AAA) data store, including a multiple IMSI location register (MILR) 402. In a particular embodiment, the MILR 402 is the MILR 358 of FIG. 3. The MILR 402 includes information associated with a plurality of mobile subscribers, including IMSI numbers, MDNs, and active location information. For example, in the embodiment shown in FIG. 4, the MILR 402 includes information associated with a first mobile subscriber (MS1) 404, a second mobile subscriber (MS2) 406, and a third mobile subscriber (MS3) 408. As shown, the MILR 402 may include information related to additional mobile subscribers, as indicated by information associated with mobile subscriber MSk 410.

In the embodiment shown in FIG. 4, the information associated with the first mobile subscriber 404 includes a first IMSI number and a first MDN associated with a first country, at 412. The information associated with the first mobile subscriber 404 also includes a second IMSI number and a second MDN associated with a second country, at 414. Similarly, the information associated with the second mobile subscriber 406 includes a first IMSI number and a first MDN associated with a first country at 418, and a second IMSI number and a second MDN associated with a second country at 420. Further, the information associated with the third mobile subscriber 408 includes a first IMSI number and a first MDN associated with a first country at 424, and a second IMSI number and a second MDN associated with a second country at 426. The MILR 402 includes information associated with multiple (e.g., k) mobile subscribers, including a first IMSI number and a first MDN associated with a first country at 430, and a second IMSI number and a second MDN associated with a second country at 432.

As shown in FIG. 4, the information associated with the first mobile subscriber 402 may include multiple IMSI numbers and multiple MDNs associated with multiple (e.g., n) countries. For example, information associated with the first mobile subscriber 404 may include IMSI(n) and MDN(n) associated with a particular (n) country, at 416. As a further example, information associated with the second mobile subscriber 406 may include IMSI(n) and MDN(n) associated with a particular (n) country, at 422. Further, information associated with the third mobile subscriber 408 may include IMSI(n) and MDN(n) associated with a particular (n) country, at 428. As noted, the MILR 402 may include information associated with multiple (k) mobile subscribers. The information associated with mobile subscriber (k) 410 may also include IMSI(n) and MDN(n) associated with a particular (n) country, at 434.

Figure 5:
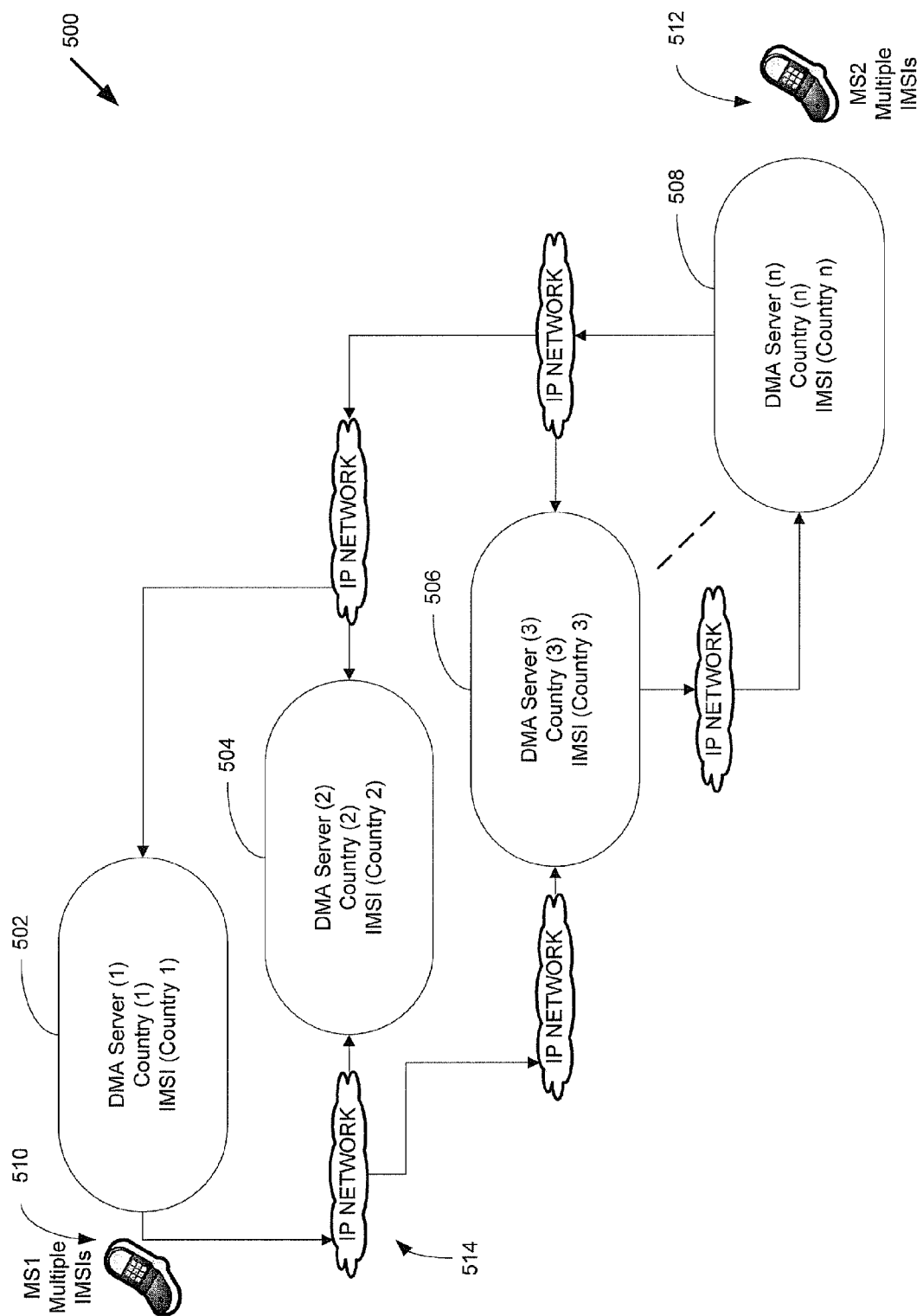
FIG. 5 is a diagram illustrating multiple distributed mobile architecture servers located in multiple countries.

Referring to FIG. 5, multiple distributed mobile architecture servers located in multiple countries are illustrated at 500. For example, a first distributed mobile architecture server 502 may be located in a first country, a second distributed mobile architecture server 504 may be located in a second country, and a third distributed mobile architecture server 506 may be located in a third country. Further, as shown at 508, there may be multiple (n) distributed mobile architecture servers in multiple countries. Each of the distributed mobile architecture servers 502, 504, 506 and 508 may be linked via an IP network 514.

For illustration purposes, a first mobile subscriber 510 may make a telephone call to a second mobile subscriber 512. When the second mobile subscriber 512 is located in the first country, the first distributed mobile architecture server 502 routes the telephone call to the second mobile subscriber 512 based on a first IMSI number associated with the first country. When the second mobile subscriber 512 is located in the second country, the second distributed mobile architecture server 504 routes the telephone call to the second mobile subscriber 512 using a second IMSI number associated with the second country. When the second mobile subscriber 512 is located in the third country, the third distributed mobile architecture server 506 routes the telephone call to the second mobile subscriber 512 using a third IMSI number associated with the third country. Further, when the second mobile subscriber 512 is located in another country (n), the distributed mobile architecture server 508 routes the telephone call to the second mobile subscriber 512 using IMSI(n) associated with that particular country. Thus, the multiple IMSI numbers allow the first mobile subscriber 510 to make a local telephone call to the second mobile subscriber 512 regardless of the location of the second mobile subscriber 512.

As another example, as shown in FIG. 5, both the first mobile subscriber 510 and the second mobile subscriber 512 may use wireless communication devices that include multiple IMSI numbers. Thus, both the first mobile subscriber 510 and the second mobile subscriber 512 may roam between multiple countries and make and receive local calls in the multiple countries. For example, the first mobile subscriber 510 may be located in the second country, and the second mobile subscriber 512 may be located in the third country. In this case, a call made from the first mobile subscriber 510 in the second country would be routed via the second distributed mobile architecture server 504 located in the second country to the second mobile subscriber 512 located in the third country. The second mobile subscriber 512 would receive the call via the third distributed mobile architecture server 506 located in the third country. The telephone call is routed from the second distributed mobile architecture server 504 located in the second country to the third distributed mobile architecture server 506 located in the third country via the IP network 514. For example, the IP network 514 may include a wireless or a wired network.

Figure 6:
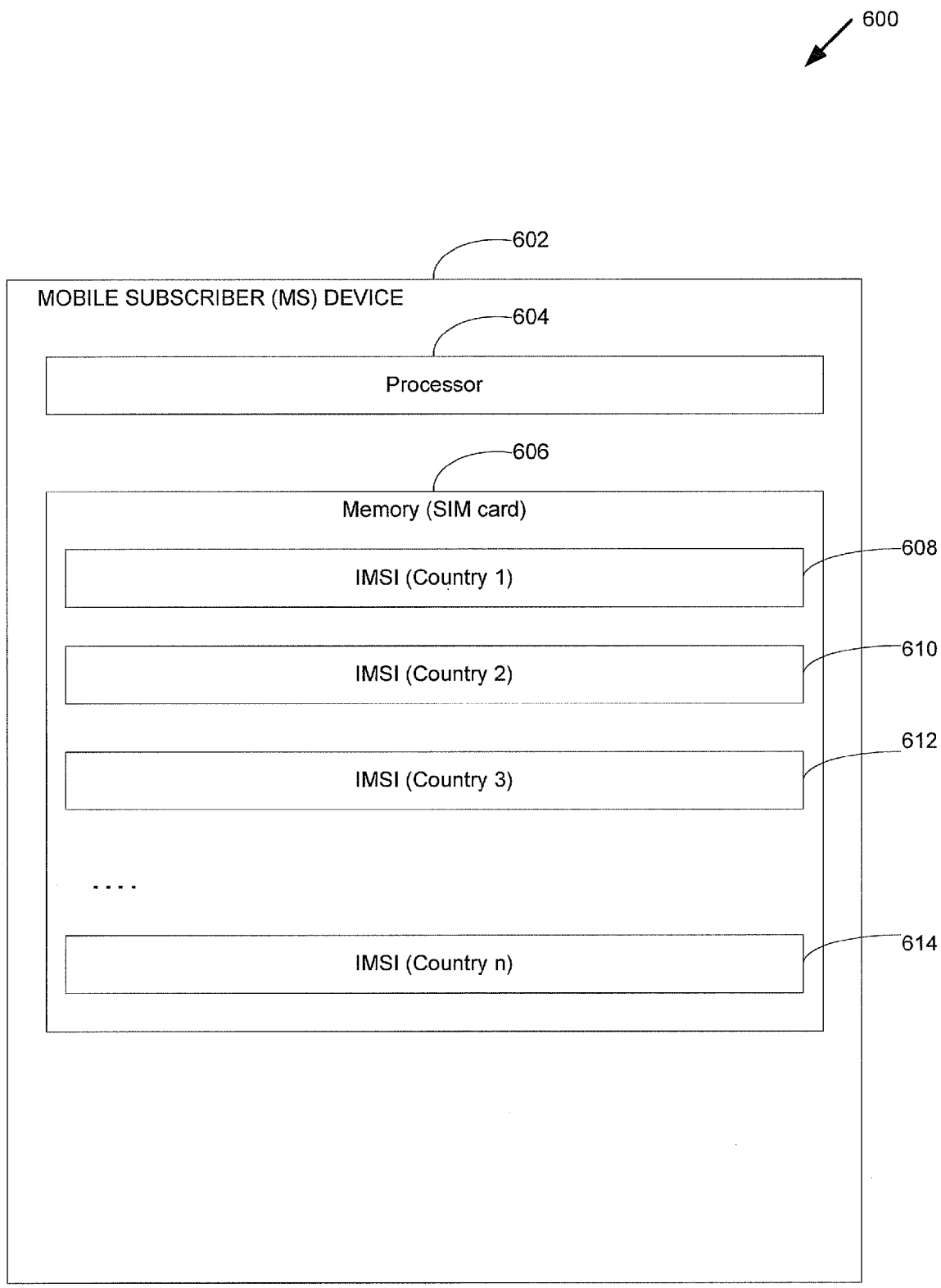
FIG. 6 is a diagram that illustrates a mobile subscriber device including multiple IMSI numbers.

FIG. 6 illustrates a mobile subscriber device 602 that includes multiple IMSI numbers. The mobile subscriber device 602 includes a processor 604 and a memory card 606, such as a Subscriber Identity Module (SIM) card. In the embodiment shown in FIG. 6, the memory card 606 includes a first IMSI number 608 associated with a first country, a second IMSI number 610 associated with a second country, and a third IMSI number 612 associated with a third country. Further, as shown at 614, the memory card 606 may include multiple IMSI numbers associated with multiple (n) countries. When the mobile subscriber device 602 is located in the first country, the first IMSI number 608 is active. Similarly, when the mobile subscriber device 602 is located in the second country, the second IMSI number 610 is active, and when the mobile subscriber device 602 is located in the third country, the third IMSI number 612 is active. Thus, the memory card 606 may enable flat roaming over countries (FroC).

In a particular embodiment, the first IMSI number 608 stored at the memory card 606 includes a first mobile country code (MCC) associated with the first country. In addition, the first IMSI number 608 includes a first mobile network code (MNC) associated with a first wireless carrier located in the first country. The first MCC associated with the first country may be included in a first set of three digits of the first IMSI number 608. The first MNC associated with the first wireless carrier may be included in a second set of three digits of the first IMSI number 608. In another particular embodiment, the second IMSI number 610 includes a second MCC associated with the second country. In addition, the second IMSI number 610 includes a second MNC associated with a second wireless carrier located in the second country. For example, the second MCC may be included in a first set of three digits of the second IMSI number 610. Further, the second MNC associated with the second wireless carrier may be included in a second set of three digits of the second IMSI number 610. Thus, each of the IMSI numbers 608, 610, 612 and 614 may include both a MCC and a MNC associated with a particular country.

When the mobile subscriber device 602 is located in the first country, the first IMSI number 608 is communicated to a first distributed mobile architecture server located in the first country. Thus, when the mobile subscriber device 602 is located in the first country, the first distributed architecture server located in the first country receives active location information via the first IMSI number 608. Similarly, when the mobile subscriber device 602 is located in the second country, the second IMSI number 610 is communicated to a second distributed mobile architecture server located in the second country. Thus, when the mobile subscriber device 602 is located in the second country, the second distributed architecture server located in the second country receives active location information via the second IMSI number 610. Similarly, when the mobile subscriber device 602 is located in the third country, active location information is communicated via the third IMSI number 612, and when the mobile subscriber device 602 is located in country (n), active location information is communicated via IMSI(n) 614.

Figure 7:
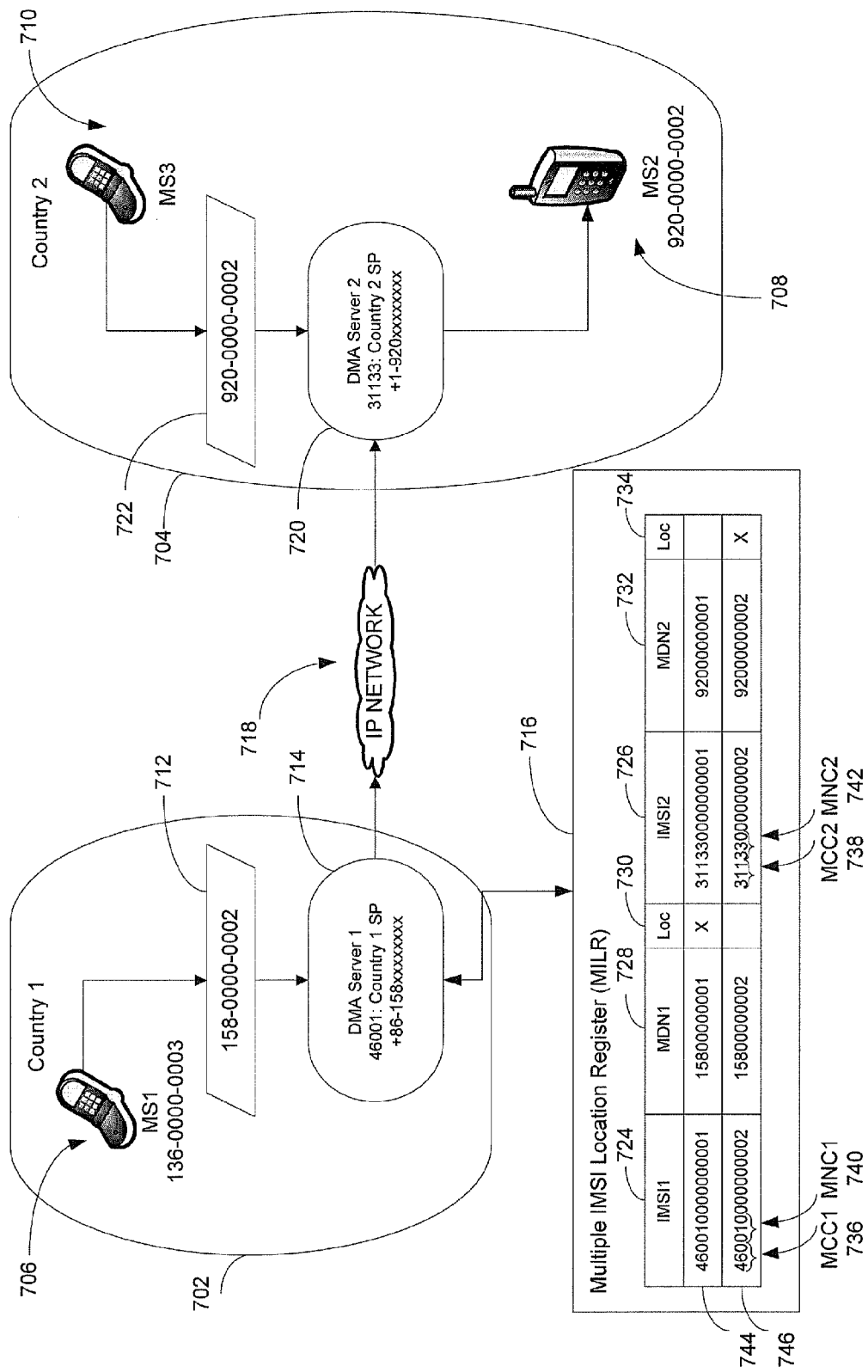
FIG. 7 is a diagram illustrating a system and method of routing telephone calls from a first country to a second country via an Internet Protocol network.

FIG. 7 illustrates a call flow from a first mobile subscriber 706 to a second mobile subscriber 708. The first mobile subscriber 706 is located in a first country 702. The second mobile subscriber 708 is located in a second country 704. The first mobile subscriber 706 places a telephone call to a first Mobile Directory Number (MDN) 712 (e.g., 158-000-0002). The telephone call is routed to a first distributed mobile architecture server 714 located in the first country 702. The first distributed mobile architecture server 714 communicates with a multiple IMSI location register (MILR) 716 to determine an active location of the second mobile subscriber 708.

The MILR 716 includes several IMSI numbers and several MDNs for multiple mobile subscribers. Each IMSI number and MDN are associated with a particular country. For example, the MILR 716 may include a first IMSI number 724 and a first MDN 728 associated with the first country 702. In addition, the MILR 716 may include a second IMSI number 726 and a second MDN 732 associated with the second country 704. In a particular embodiment, the first three digits of the first IMSI number 724 includes a first multiple country code (MCC) 736, and the second three digits of the first IMSI number 724 includes a first mobile network code (MNC) 740. Similarly, the second IMSI number 726 includes a second MCC 738 in the first three digits and a second MNC 742 in the second three digits.

In the embodiment shown in FIG. 7, the MILR 716 includes information 744 for a first mobile subscriber and information 746 for a second mobile subscriber (e.g., the second mobile subscriber 708). When the second mobile subscriber 708 is located in the second country 704 (as in FIG. 7), this active location information is stored in the MILR 716, at 734. For illustration purposes, when the second mobile subscriber 708 is located in the first country 702, this active location information is stored in the MILR 716, at 730.

When the first distributed mobile architecture server 714 communicates with the MILR 716, the active location information determines whether to transmit the call to another distributed mobile architecture server in another country. For example, in the embodiment shown in FIG. 7, the information 746 for the second mobile subscriber 708 indicates that the second mobile subscriber 708 is currently located in the second country (e.g., active location information stored at 734). Thus, based on information retrieved from the MILR 716, the first distributed mobile architecture server 714 determines that the telephone call is to be transmitted to a second distributed mobile architecture server 720 located in the second country 704. The second MDN 732 associated with the second country 704 (e.g., 920-0000-0002) is transmitted to the second distributed mobile architecture server 720 located in the second country 704. The first distributed mobile architecture server 714 communicates with the second distributed mobile architecture server 720 via an IP network 718.

In a particular embodiment, the first MDN 728 associated with the first country 702 (e.g., 158-000-0002) is a local telephone number in the first country 702. Thus, the first mobile subscriber 706 is able to make a local telephone call to the second mobile subscriber 708 even when the second mobile subscriber 708 is located in the second country 704. In another particular embodiment, a third mobile subscriber 710 located in the second country 704 may also make local telephone calls to the second mobile subscriber 708. For example, the third mobile subscriber 710 may make a local telephone call to the second mobile subscriber 708 using the second MDN 732 associated with the second country 704 (e.g., 920-0000-0002). Thus, the second mobile subscriber 708 is able to receive local telephone calls from mobile subscribers in multiple countries while roaming between multiple countries.

Figure 8:
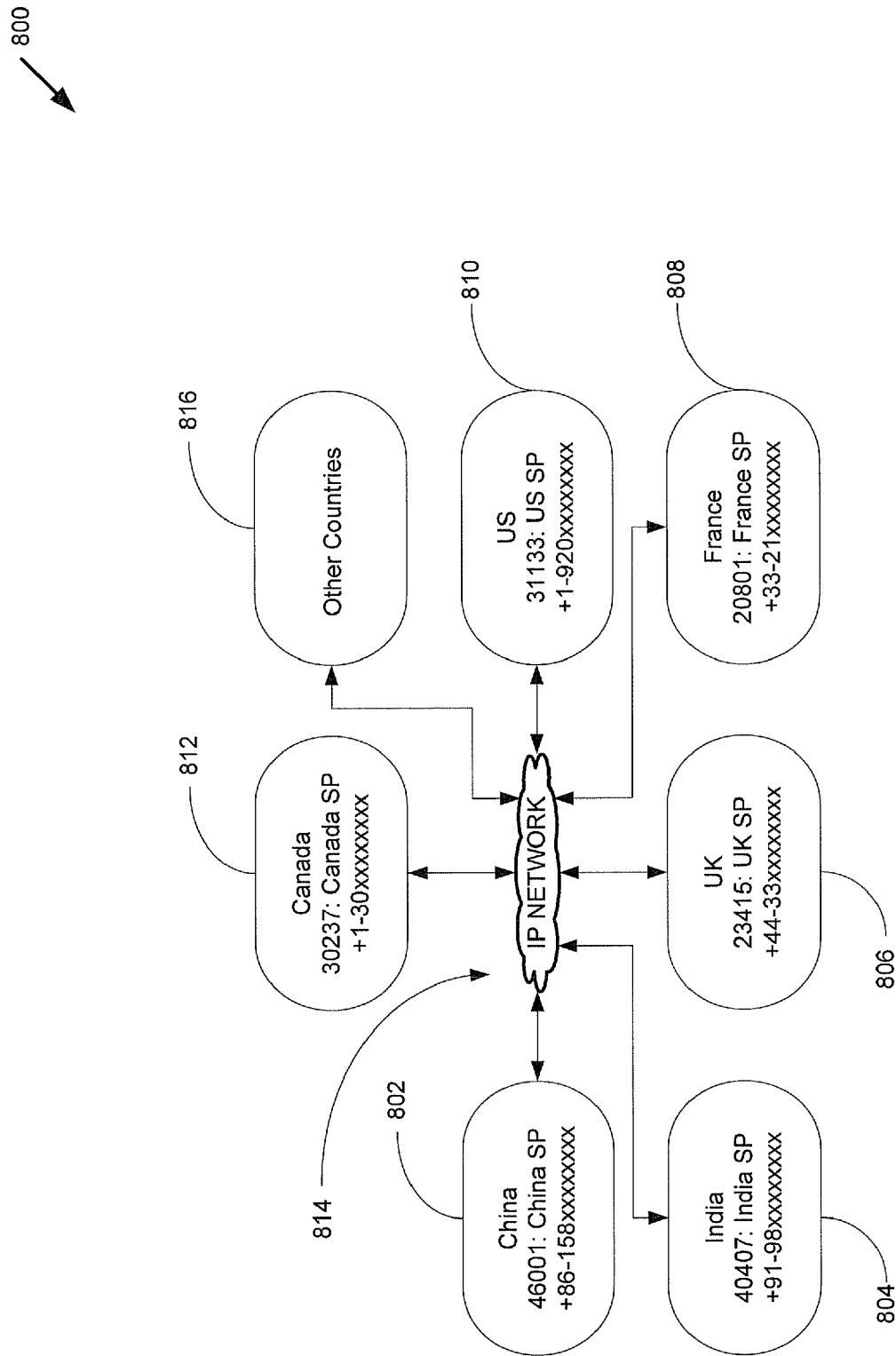
FIG. 8 is a block diagram illustrating multiple distributed mobile architecture servers and multiple service provider networks.

FIG. 8 illustrates that multiple distributed mobile architecture servers may be located in multiple countries, and the multiple distributed mobile architecture servers are linked via an IP network. For example, a distributed mobile architecture server in China 802 may communicate via an IP network 814 with one or more other distributed mobile architecture servers located in other countries. For example, the other distributed mobile architecture servers may be located in India 804, in the United Kingdom 806, in France 808, in the United States 810, in Canada 812, or in other countries 816. It should be understood that the countries listed in FIG. 8 are merely for illustrative purposes only, and any number of countries may be included.

A call from a first mobile subscriber in China may be received at the distributed mobile architecture server 802 located in China. In a particular embodiment, the calls may be local telephone calls to a second mobile subscriber. The local telephone calls are received at the distributed mobile architecture server 802 located in China. The local telephone calls may be routed to one of several countries depending on a location of the second mobile subscriber. For example, the second mobile subscriber may be located in the United States, and a local call made in China may be routed to the distributed mobile architecture server 810 located in the United States via the IP network 814. When the second mobile subscriber is located in the United States, an IMSI number associated with the United States is active. The second IMSI number associated with the United States is communicated to the other distributed mobile architecture servers via the IP network 814. Active location information enables the other distributed mobile architecture servers to track the location of the second mobile subscriber. At any time, the second mobile subscriber may be located in any number of countries. Thus, the active location information is dynamic in nature.

For example, when the second mobile subscriber is located in Canada, an IMSI number associated with Canada is communicated as the active location to the other distributed mobile architecture servers via the IP network 814. For example, the active location information may be communicated to the distributed mobile architecture server 802 located in China. Thus, when the second mobile subscriber is roaming in Canada, the active location information is maintained in the distributed mobile architecture server 802 in China.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer readable storage medium, comprising:
    a multiple International Mobile Subscriber Identity (IMSI) location register (MILR) module to store:
        a first IMSI number and a first Mobile Directory Number (MDN) associated with a mobile communication device of a mobile subscriber, wherein the first IMSI number and the first MDN are associated with a first country, and wherein the first MDN is a local telephone number in the first country;
        a second IMSI number and a second MDN associated with the mobile communication device, wherein the second IMSI number and the second MDN number are associated with a second country, and wherein the second MDN is a local telephone number in the second country; and
        location information, wherein the first IMSI number is active when the mobile communication device is located in the first country, and wherein the second IMSI number is active when the mobile communication device is located in the second country.

2. The non-transitory computer readable storage medium of claim 1, further comprising instructions that, when executed by a processor, cause the processor to:
    determine, based on the location information, a location of the mobile communication device; and
    route communication data to the mobile communication device based on the location of the mobile communication device.

3. The non-transitory computer readable storage medium of claim 2, further comprising instructions that, when executed by the processor, cause the processor to route the communication data to the mobile communication device via an Internet Protocol (IP) network when the mobile communication device is located in the second country.

4. The non-transitory computer readable storage medium of claim 2, further comprising instructions that, when executed by the processor, cause the processor to route the communication data to the mobile communication device when the mobile communication device is located in the first country.

5. The non-transitory computer readable storage medium of claim 1, wherein the MILR module further stores:
    a third IMSI number and a third MDN associated with the mobile communication device, wherein the third IMSI number and the third MDN are associated with a third country, and wherein the third MDN is a local telephone number in the third country,
    wherein the third IMSI number is active when the mobile communication device is located in the third country.

6. The non-transitory computer readable storage medium of claim 5, further comprising instructions that, when executed by the processor, cause the processor to:
    determine, based on the location information, a location of the mobile communication device; and
    route communication data to the mobile communication device via an Internet Protocol (IP) network when the mobile communication device is located in the third country.

7. A system comprising:
    a distributed mobile architecture (DMA) server that is located in a first country, the DMA server comprising:
        a processor;
        a multiple International Mobile Subscriber Identity (IMSI) location register (MILR) module to store:
            a first International Mobile Subscriber Identity (IMSI) number and a first Mobile Directory Number (MDN) associated with a mobile communication device of a mobile subscriber, wherein the first IMSI number and the first MDN are associated with a first country, and wherein the first MDN is a local telephone number in the first country;
            a second IMSI number and a second MDN associated with the mobile communication device, wherein the second IMSI number and the second MDN number are associated with a second country, and wherein the second MDN is a local telephone number in the second country; and
            location information, wherein the first IMSI number is active when the mobile communication device is located in the first country, and wherein the second IMSI number is active when the mobile communication device is located in the second country; and
        instructions that, when executed by the processor, cause the processor to:
            determine, based on the location information, a location of the mobile communication device; and
            route communication data to the mobile communication device based on the location of the mobile communication device.

8. The system of claim 7, wherein the communication data is routed to the mobile communication device via an Internet Protocol (IP) network when the mobile communication device is located in the second country.

9. The system of claim 8, wherein the communication data is routed to a second DMA server that is located in the second country.

10. The system of claim 8, wherein no international or long distance charges are associated with routing the communication data to the second country via the IP network.

11. The system of claim 8, wherein the communication data is associated with a telephone call to the first MDN of the mobile subscriber.

12. The system of claim 8, wherein the communication data is associated with a short message service (SMS) message to the first MDN of the mobile subscriber.

13. The system of claim 8, wherein the IP network includes a wireless link between the first country and the second country.

14. The system of claim 8, wherein the wireless link includes a satellite link.

15. The system of claim 8, wherein the IP network includes a wired link between the first country and the second country.

16. The system of claim 8, wherein the first DMA server further comprises a base transceiver station (BTS) interface and wherein the communication data is routed to the mobile communication device via the BTS interface when the mobile communication device is located in the first country.

17. A method comprising:
   receiving communication data that is directed to a first Mobile Directory Number (MDN) that is associated with a mobile communication device of a mobile subscriber, wherein the first MDN is a local telephone number in a first country, wherein the mobile communication device is associated with a second MDN, and wherein the second MDN is a local telephone number in a second country;
   determining a location of the mobile communication device, wherein a first International Mobile Subscriber Identity (IMSI) number associated with the first MDN is active when the mobile communication device is located in the first country, and wherein a second IMSI number associated with the second MDN is active when the mobile communication device is located in the second country; and
   routing the communication data to the mobile communication device based on the location of the mobile communication device.

18. The method of claim 17, wherein the communication data is routed to the mobile communication device via an Internet Protocol (IP) network when the second IMSI number is active.

19. The method of claim 18, wherein the mobile communication device is associated with a third MDN, wherein the third MDN is a local telephone number in a third country, and wherein a third IMSI number associated with the third MDN is active when the mobile communication device is located in the third country.

20. The method of claim 19, wherein the communication data is routed to the mobile communication device via an Internet Protocol (IP) network when the third IMSI number is active.

\* \* \* \* \*